US012743389B1

(12) United States Patent
Bunce et al.

(10) Patent No.: US 12,743,389 B1
(45) Date of Patent: Sep. 22, 2026

(54) CIRCUIT AND METHOD WITH AGE-AND-BRINK-BASED ARBITRATION

(71) Applicant: Marvell Asia Pte Ltd, Singapore (SG)

(72) Inventors: Robert Michael Bunce, Cary, NC (US); Thomas Lorne Drabenstott, Cary, NC (US); Jeffrey Richard Hardesty, Cary, NC (US)

(73) Assignee: Marvell Asia Pte Ltd, Singapore (SG)

( * ) Notice: Subject to any disclaimer, the term of this patent is extended or adjusted under 35 U.S.C. 154(b) by 56 days.

(21) Appl. No.: 18/650,683

(22) Filed: Apr. 30, 2024

Related U.S. Application Data

(60) Provisional application No. 63/538,054, filed on Sep. 12, 2023.

(51) Int. Cl.
*G06F 13/366* (2006.01)
*G06F 13/36* (2006.01)
*G06F 13/362* (2006.01)

(52) U.S. Cl.
CPC ............ *G06F 13/366* (2013.01); *G06F 13/36* (2013.01); *G06F 13/362* (2013.01)

(58) Field of Classification Search
None
See application file for complete search history.

(56) References Cited

U.S. PATENT DOCUMENTS 6,836,812 B2 * 12/2004 Lin .................... G06F 13/1626 710/305
7,143,219 B1 11/2006 Chaudhari et al.
7,521,961 B1 4/2009 Anderson
7,739,436 B2 6/2010 Meyer
8,467,213 B1 6/2013 Channabasappa
9,620,215 B2 * 4/2017 Matsuo .................. G11C 16/00
11,115,504 B2 9/2021 Balasubramanian et al.
11,769,832 B2 9/2023 Han et al.
12,353,764 B1 7/2025 Bunce
2002/0176428 A1 * 11/2002 Ornes .................. H04L 47/522 370/458
2003/0028713 A1 2/2003 Khanna et al.
2005/0050253 A1 * 3/2005 Rengarajan ........... G06F 13/364 710/110

(Continued)

OTHER PUBLICATIONS

U.S. Appl. No. 18/299,397, entitled “Selective Mesh Routing Through Non-adjacent Nodes” filed Apr. 12, 2023.

(Continued)

*Primary Examiner* — Michael Sun
(74) *Attorney, Agent, or Firm* — Hamilton, Brook, Smith & Reynolds, P.C.

(57) ABSTRACT

A circuit and corresponding method perform arbitration. The circuit comprises an arbiter that outputs a selection for accessing a shared resource. The selection is based on input priorities for multiple requesters that share the shared resource. The input priorities are controlled via an age parameter and a brink parameter. The age and brink parameters are associated with buffers of the multiple requesters. The circuit further comprises output logic that selects a requester of the multiple requesters based on the selection output and transfers a stored data element from a buffer of the requester selected to the shared resource. By employing both age and brink parameters, latency and bandwidth in a network on a chip (NoC) that employs the circuit are improved.

28 Claims, 8 Drawing Sheets

(56) References Cited

U.S. PATENT DOCUMENTS

| | | | | |
|---|---|---|---|---|
| 2005/0160188 | A1* | 7/2005 | Bogin | G06F 13/161 710/1 |
| 2006/0101179 | A1* | 5/2006 | Lee | G06F 13/364 710/113 |
| 2007/0088918 | A1* | 4/2007 | Venkatrao | G06F 13/1631 711/154 |
| 2009/0222841 | A1* | 9/2009 | Mirajkar | G06F 13/385 719/321 |
| 2009/0285222 | A1 | 11/2009 | Hoover et al. | |
| 2009/0316700 | A1 | 12/2009 | White et al. | |
| 2010/0013517 | A1 | 1/2010 | Manohar et al. | |
| 2012/0072631 | A1* | 3/2012 | Chirca | G06F 12/1458 710/244 |
| 2012/0215976 | A1 | 8/2012 | Inoue | |
| 2014/0201471 | A1* | 7/2014 | Cutter | G06F 13/1663 711/151 |
| 2014/0215185 | A1 | 7/2014 | Danielsen | |
| 2015/0006776 | A1 | 1/2015 | Liu et al. | |
| 2015/0188847 | A1 | 7/2015 | Chopra et al. | |
| 2015/0205530 | A1 | 7/2015 | Eilert et al. | |
| 2016/0224481 | A1* | 8/2016 | Ambroladze | G06F 13/1652 |
| 2017/0195295 | A1 | 7/2017 | Tatlicioglu et al. | |
| 2017/0300333 | A1 | 10/2017 | Wang et al. | |
| 2018/0159800 | A1* | 6/2018 | Tietz | H04L 49/9047 |
| 2018/0301201 | A1 | 10/2018 | Kantipudi | |
| 2018/0349300 | A1* | 12/2018 | Bubb | G06F 3/061 |
| 2021/0385164 | A1 | 12/2021 | Parmar et al. | |
| 2022/0405566 | A1 | 12/2022 | Winterbottom et al. | |
| 2023/0059948 | A1 | 2/2023 | Wang et al. | |
| 2023/0113197 | A1 | 4/2023 | Kasat et al. | |
| 2023/0315898 | A1 | 10/2023 | Alaeddini | |
| 2023/0316334 | A1 | 10/2023 | Vankayala | |
| 2024/0048508 | A1 | 2/2024 | Viego et al. | |
| 2024/0169124 | A1 | 5/2024 | Batson et al. | |

OTHER PUBLICATIONS

U.S. Appl. No. 18/478,127, entitled “Latency Oriented Routing” filed Sep. 29, 2023.

Wikipedia, “Network on a chip” retrieved from the Internet at https://en.wikipedia.org/wiki/Network_on_a_chip on Apr. 25, 2024.

U.S. Appl. No. 18/320,713, entitled “Circuit and Method with Weight-Based Arbitration” filed May 19, 2023.

U.S. Appl. No. 18/320,738, entitled “Circuit and Method for Dynamic-Weight Based Arbitration” filed May 19, 2023.

U.S. Appl. No. 18/320,779 entitled “Circuit and Method with Vector-Based Arbitration” filed May 19, 2023.

U.S. Appl. No. 18/328,542 entitled “Single Cycle Request Arbiter” filed Jun. 2, 2023.

U.S. Appl. No. 17/934,017 entitled “Directional Link Credit-Based Packet Transmission” filed Sep. 21, 2022.

Fusella, et al., “Understanding Turn Models for Adaptive Routing: the Modular Approach,” Design, Automation and Test in Europe (2018) 1489-1492.

Glass, et al., “The Turn Model for Adaptive Routing,” Advanced Computer Systems Laboratory, 1992, 278-287.

Khan, et al., “Design of a Round Robin Arbiter on Resource Sharing,” Proceedings of 8th IRF International Conference, May 4, 2014, Pune, India.

Lee, et al., “Probabilistic Distance-based Arbitration: Providing Equality of Service for Many-core CMPs,” 2010 43rd Annual IEEE/ACM International Symposium on Microarchitecture, pp. 509-519.

Mandal, et al., “Theoretical Analysis and Evaluation of NoCs with Weighted Round-Robin Arbitration,” Dept. of ECE, University of Wisconsin-Madison, Aug. 21, 2021.

Merchant, “The Design and Performance Analysis of an Arbiter for a Multi-Processor Shared-Memory System,” Aug. 1984, Laboratory for Information and Decision Systems, Massachusetis Institute of Technology, Cambridge, Massachusetts 02139.

Next Hop Definition, Created Nov. 17, 2005, Retrieved from the Internet at http://www.linfo.org/next_hop.html on Sep. 15, 2022, The Linux Information Project.

Wikipedia, “Mesh Interconnect Architecture—Intel,” Retrieved from the Internet on Nov. 23, 2022 at https://en.wikipedia.org/wiki/Turn_restriction_routing.

* cited by examiner

CIRCUIT AND METHOD WITH AGE-AND-BRINK-BASED ARBITRATION

RELATED APPLICATION

This application claims the benefit of U.S. Provisional Application No. 63/538,054, filed on Sep. 12, 2023. The entire teachings of the above application are incorporated herein by reference.

BACKGROUND

When there is a resource that is shared by multiple requesters, it is useful to have an arbiter that accepts requests and ensures that only one requester is granted use of the resource in a specific period, typically one clock cycle for non-limiting example. Non-limiting examples of shared resources include a port, network, bus, memory, and silicon backplane.

Round-robin (RR) arbitration is a commonly used arbitration policy. In a typical RR arbitration policy, the requesters arbitrate for a token to access a shared resource and such requesters are assigned a fixed order of priority rotation. For example, the fixed order of three requesters, namely R1, R2, and R3, could be R1, R2, R3 and back to R1. With typical RR arbitration, a requester that was granted the token in a previous clock cycle may be considered the lowest priority requester in a present clock cycle that immediately follows the previous clock cycle. A requester that immediately follows the lowest priority requester in the fixed order may be considered the highest priority requester in the present clock cycle. For example, if R2 was granted the token in the previous clock cycle, then, in the present clock cycle, R2 would be considered the lowest priority requester and R3 would be considered the highest priority requester, followed by R1 and finally R3. If R3 requests and is granted the token, then it would become the lowest priority, and the resulting arbitration order would then be R1, R2, then R3.

SUMMARY

According to an example embodiment, a circuit comprises an arbiter configured to output a selection for accessing a shared resource. The selection is based on input priorities for multiple requesters configured to share the shared resource. The input priorities are controlled via an age parameter and a brink parameter. The age and brink parameters are associated with buffers of the multiple requesters. The circuit further comprises output logic coupled to the arbiter. The output logic is configured to select a requester of the multiple requesters based on the selection output and transfer a stored data element from a buffer of the requester selected to the shared resource.

The arbiter may be further configured to cause the stored data element to be output from the buffer to the output logic via the selection output.

The age parameter may represent a threshold number of clock cycles for storing a data element in a respective buffer of a requester of the multiple requesters. The clock cycles may be associated with a clock of the circuit. The brink parameter may represent a threshold number of buffer entries available in the respective buffer prior to overflow of the respective buffer.

The circuit may further comprise age-and-brink logic corresponding to a requester of the multiple requesters. The age-and-brink logic may be configured to generate a source priority indicator, a brink-threshold-reached indicator, and an age-threshold-reached indicator. The age-and-brink logic may be further configured to control an input priority of the input priorities based on the source priority indicator generated, the brink-threshold-reached indicator generated, and the age-threshold-reached indicator generated. The input priority may correspond to the requester and may represent a prioritized status or a non-prioritized status. The age-and-brink logic may be further configured to cause the input priority to represent the prioritized status in an event the source priority indicator generated, brink-threshold-reached indicator generated, age-threshold-reached indicator generated, or a combination thereof are asserted, and to represent the non-prioritized status otherwise.

The age-and-brink logic may be further configured to assert the source priority indicator generated in an event at least one data element stored in a respective buffer of the requester is associated with an asserted source priority identifier and to de-assert the source priority indicator generated in an event there is no data element stored in the respective buffer that is associated with the asserted source priority identifier. The age-and-brink logic may be further configured to assert the brink-threshold-reached indicator generated in an event a total number of data elements stored in the respective buffer is at or above a brink threshold and de-assert the brink-threshold-reached indicator in an event the total number of data elements stored is below the brink threshold. The brink threshold may be a difference between a total number of entries of the respective buffer and the brink parameter. The age-and-brink logic may be further configured to assert the age-threshold-reached indicator generated in an event a data element stored at a head of the respective buffer is associated with an age that is at or above an age threshold, and de-assert the age-threshold-reached indicator otherwise. The age parameter may represent the age threshold.

The arbiter may be further configured to select a requester of the multiple requesters to participate in a high priority arbitration cycle in an event a respective input priority of the requester represents a prioritized status and to exclude the requester from the high priority arbitration cycle in an event the respective input priority of the requester represents the non-prioritized status.

The circuit may further comprise age-and-brink logic configured to control an input priority for a respective requester based on a comparison of a brink threshold with a total number of data elements stored in a first-in first-out (FIFO) queue of the respective requester. The brink threshold may be a difference between a total number of entries of the FIFO queue and the brink parameter.

The circuit may further comprise age-and-brink logic configured to control an input priority for a respective requester based on a comparison of the age parameter with an age of an oldest, topmost data element of a FIFO queue of the respective requester. The age parameter may represent a threshold number of clock cycles of a clock of the circuit. The age may be a total count of clock cycles of the clock for which the oldest, topmost data element has been queued in the FIFO queue.

The circuit may further comprise age-and-brink logic configured to control an input priority for a respective requester by configuring the input priority to represent a prioritized status or a non-prioritized status. The arbiter may be further configured to select a requester of the multiple requesters to participate in a high priority arbitration cycle in an event a respective input priority of the requester represents the prioritized status. The arbiter may be further configured to exclude the requester from the high priority arbitration cycle in an event the respective input priority of the requester represents the non-prioritized status.

The buffer may be a FIFO queue for non-limiting example. The selection output may be configured to cause the stored data element to be popped from the FIFO queue to the output logic. The shared resource may be a transmit (TX) port (output port) for non-limiting example.

The arbiter may be a round-robin arbiter. The selection output may be further based on round-robin priorities of the multiple requesters.

The circuit may be located on a chip. The circuit may be coupled to an interconnect of the chip. The multiple requesters may be receive (RX) ports of the circuit and the shared resource may be a TX port of the circuit for non-limiting examples.

The arbiter may be further configured to output the selection based on round-robin arbitration and to exclude a requester of the multiple requesters from the round-robin arbitration in an event the requester has no pending request for the shared resource or in an event the requester does not have at least one credit for a pending request. The pending request may be for transmission of a packet via the shared resource for non-limiting example.

The arbiter may be further configured to output the selection on a cycle-by-cycle basis.

According to another example embodiment, a method comprises outputting a selection for accessing a shared resource. The selection is based on input priorities for multiple requesters configured to share the shared resource. The input priorities are controlled via an age parameter and a brink parameter. The age and brink parameters are associated with buffers of the multiple requesters. The method further comprises selecting a requester of the multiple requesters based on the selection output and transferring a stored data element from a buffer of the requester selected to the shared resource.

Further alternative method embodiments parallel those described above in connection with the example circuit embodiment.

According to another example embodiment, an apparatus comprises means for outputting a selection for accessing a shared resource. The selection is based on input priorities for multiple requesters configured to share the shared resource. The input priorities are controlled via an age parameter and a brink parameter. The age and brink parameters are associated with buffers of the multiple requesters. The apparatus further comprises means for selecting a requester of the multiple requesters based on the selection output and means for transferring a stored data element from a buffer of the requester selected to the shared resource.

Further alternative apparatus embodiments parallel those described above in connection with the example circuit embodiment.

It should be understood that example embodiments disclosed herein can be implemented in the form of a method, apparatus, system, or computer readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
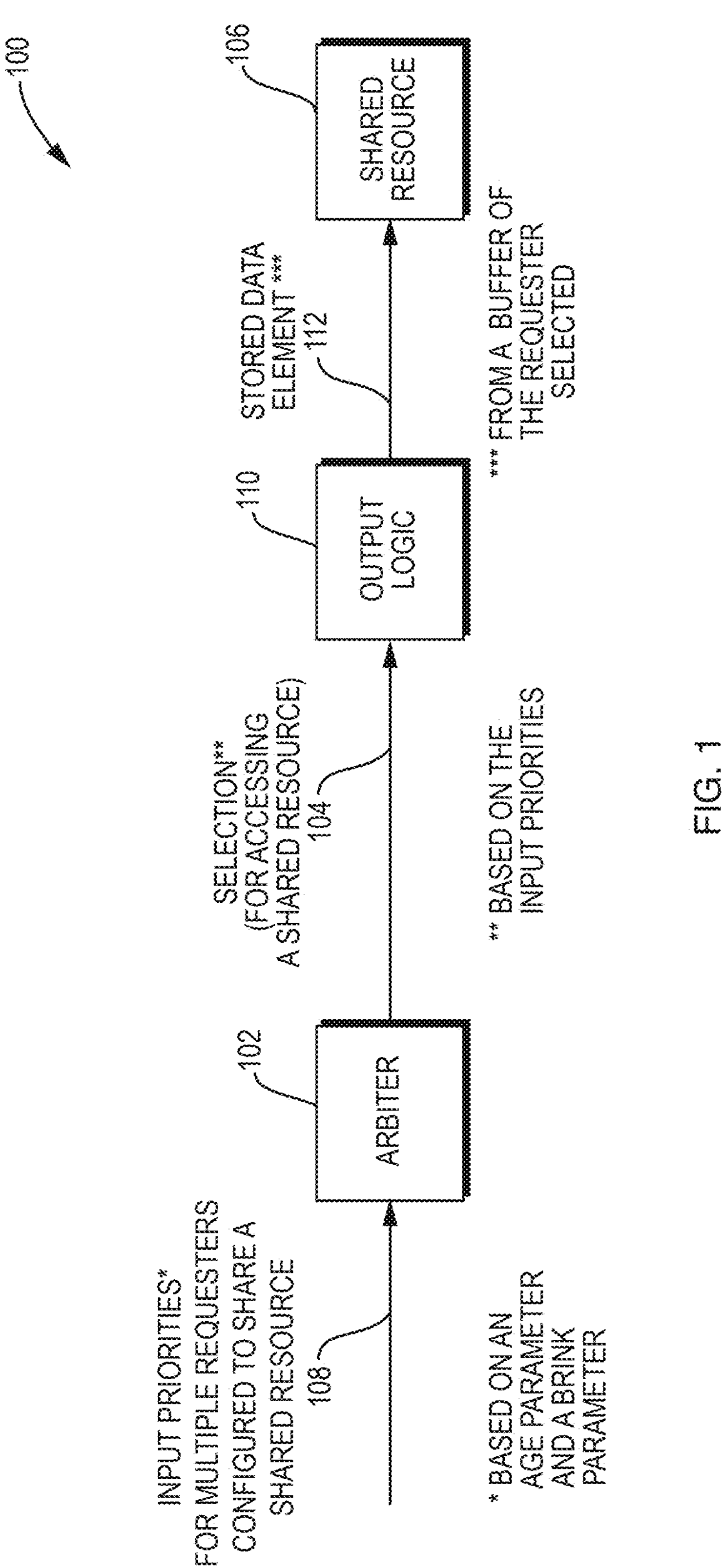
FIG. 1 is a block diagram of an example embodiment of a circuit that performs arbitration.

A description of example embodiments follows.

A tile, as referred to herein may be a device, such as a memory device for non-limiting example. A tile may be referred to interchangeably herein as a node or device. A topology of a plurality of tiles may be referred to herein as an array or a mesh. It should be understood that a number of tiles or an arrangement of such tiles in an example embodiment disclosed herein is for non-limiting example.

As disclosed herein, an element may be considered "asserted" if the element is in its active state. For example, a signal that is active high may be considered asserted if a state of the signal is high. Similarly, a signal that is active low may be considered asserted if a state of the signal is low.

It should be understood that while an example embodiment of a circuit disclosed herein may be shown or described as employing a particular logic gate, such as an AND gate or an OR gate, it should be understood that an implementation of the circuit is not limited to employing same and may employ alternative hardware that performs an equivalent function. It should also be understood that a total number of receive (RX) ports and a total number of transmit (TX) ports described or shown in figures of the present disclosure is not limited to such total number of RX ports or total number of TX ports.

A transfer of data between two tiles (nodes) may be referred to herein as a "hop." A next hop, as referred to herein, may refer to an immediate next tile (node) to which the data is to be transferred.

An arbiter, as referred to herein, may be referred to interchangeably herein as a request arbiter or single cycle request arbiter and may employ an example embodiment of a request arbiter disclosed in U.S. patent application Ser. No. 18/328,542, entitled "SINGLE CYCLE REQUEST ARBITER," filed on Jun. 2, 2023, the entire teachings of which are incorporated herein by reference. As such, an example embodiment of an arbiter disclosed herein may be a round-robin priority arbiter that can grant requests in the same clock cycle and a new request every clock cycle.

A credit, as referred to herein, may represent permission to transmit a packet to a next hop. Such permission may be based on whether the next hop has storage capacity to accept the packet, such as an empty entry in a first-in first-out (FIFO) queue at the next hop for non-limiting example. Such a credit may be a directional link credit for non-limiting example, such as disclosed in U.S. patent application Ser.

No. 17/934,017, entitled "Directional Link Credit-Based Packet Transmission," filed on Sep. 21, 2022, the entire teachings of which are incorporated herein by reference.

A FIFO queue and FIFO queues may be referred to interchangeably herein simply as a FIFO and FIFOs, respectively. While an example embodiment disclosed herein may be described as employing a FIFO for a buffer, it should be understood that such buffer is not limited to being a FIFO.

While an example embodiment of priority disclosed herein may be described as a two-level priority, such as prioritized and non-prioritized, it should be understood that such priority is for non-limiting example and may be scaled to include three or more levels.

In a mesh-based network on a chip (NoC), tiles (nodes) may be arranged in a topology, such as a row/column structure for non-limiting example, and may communicate with neighboring tiles in cardinal directions, such as north, south, east, and west directions, for non-limiting example. In such an architecture, three buffers of input source data, referred to interchangeably herein as source buffers, may be employed by a tile per output direction. Such source buffers may be FIFOs for non-limiting example. The source buffers may correspond to receive ports of the tile that may buffer input source data, such as packets for non-limiting example, for sending in the output direction via an output (transmit) port of the tile. Such receive ports of a tile have corresponding source buffers and may be referred to herein as requesters Each cycle that data is available in more than one of such source buffers of the requesters, a problem to be solved is how to select a requester, and thereby a source buffer of the requester, for data transfer in the output direction to achieve fairness, while minimizing average and maximum latency across the mesh-based network and maximizing aggregate bandwidth of the mesh-based network. An example embodiment of a circuit that may be employed for such requester/buffer selection and data transfer is disclosed further below with regard to FIG. 1.

To solve the above-noted problem, round-robin arbitration is typically used. Fairness is achieved by rotating the arbitration priority after each round of arbitration, such that a "winning" buffer (e.g., FIFO) in a current round of arbitration, that is, the highest priority buffer in the current round of arbitration, becomes the lowest priority buffer in the immediate next round of arbitration.

To decrease the maximum latency that a packet waits to be selected and transferred, an example embodiment may associate an "age" with each entry in the buffer (e.g., FIFO) or, simply, with an oldest entry of the buffer. Such age may be represented by at least one bit for non-limiting example. If the age of the oldest, topmost entry, such as the "head" of a FIFO, is greater than an age threshold, then an example embodiment may consider the buffer (e.g., the FIFO), or a corresponding requester that fills such a buffer, as high priority (i.e., "prioritized") and allow the requester/buffer to participate in a high priority arbitration cycle that excludes all non-prioritized buffers (e.g., FIFOs).

Additionally, if a buffer is near fullness based on a "brink" parameter, then it may also be considered high priority. According to an example embodiment, a brink threshold may represent a near full threshold of the buffer. The brink threshold may be computed as a difference between a total number of buffer entries of the buffer and the brink parameter. During arbitration, high priority buffers may be arbitrated and chosen in lieu of buffers that do not have high priority. Through cycle accurate performance modeling, it was found that neither use of the age parameter nor the brink parameter by itself significantly helped performance metrics; however, by combining use of both of them, a notable performance advantage was achieved. An example embodiment of circuit that considers both is disclosed below with regard to FIG. 1.

FIG. 1 is a block diagram of an example embodiment of a circuit 100 that performs arbitration. The circuit 100 comprises an arbiter 102 configured to output a selection 104 for accessing a shared resource 106. The selection 104 may be based on input priorities 108 for multiple requesters (not shown) configured to share the shared resource 106. The input priorities 108 may be controlled via an age parameter (not shown) and a brink parameter (not shown). The age and brink parameters may be associated with buffers (not shown) of the multiple requesters. The circuit 100 further comprises output logic 110 coupled to the arbiter 102. The output logic 110 may be configured to select a requester (not shown) of the multiple requesters based on the selection 104 output and transfer a stored data element 112 from a buffer (not shown) of the requester selected to the shared resource 106. The arbiter 102 may be further configured to output the selection 104 on a cycle-by-cycle basis. The circuit 100 may be located on a chip, such as the chip 225 of FIG. 2A for non-limiting example.

Figure 2A:
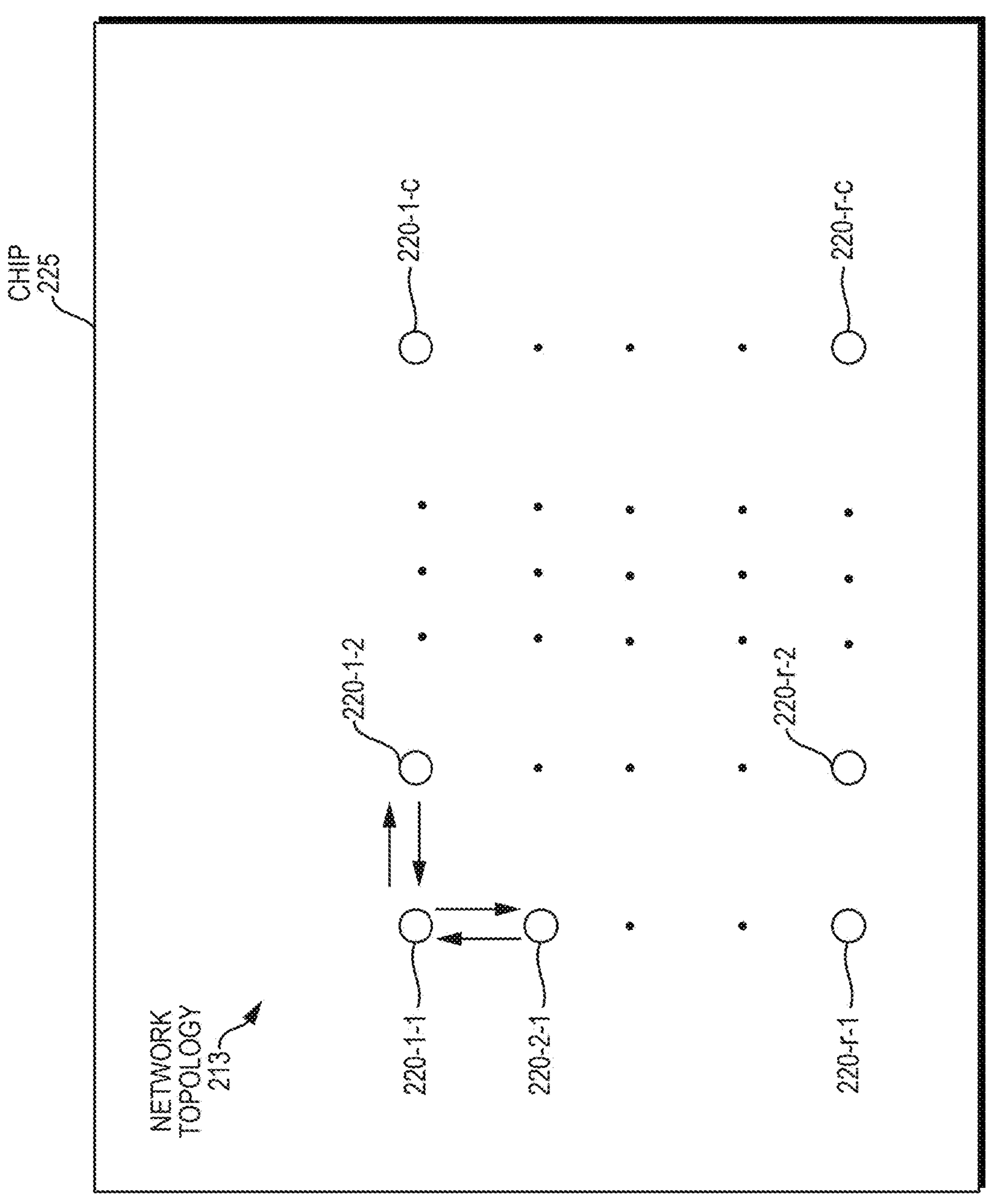
FIG. 2A is a block diagram of an example embodiment of a chip with a plurality of nodes arranged in a network topology.

FIG. 2A is a block diagram of an example embodiment of a chip 225 with a plurality of nodes (220-1-1, . . . 2202-*r*-*c*) arranged in a network topology 213 for non-limiting example. Such nodes may be referred to interchangeably herein as tiles. In the network topology 225, an interconnect for coupling such nodes is not shown and neighboring nodes (NBNs) are nodes that are adjacent to other nodes for non-limiting example. For example, the node 220-1-1 is a neighboring node (NBN) to the node 220-1-2 and vice versus and the node 220-1-1 is a NBN to the node 220-2-1 and vice-versus. The chip 225 may include a mesh interconnect (not shown) and the network topology 213 may be a mesh network topology for non-limiting example. The network topology 213 may be referred to as a mesh-based NoC.

The network topology 213 may be considered a grid in the non-limiting example embodiment and it should be understood that another topology may be employed, such as a ring or other topology. With reference to FIG. 1 and FIG. 2A, in the network topology 213, a node (tile) may include the circuit 100 of FIG. 1, disclosed above, that comprises the arbiter 102 configured to employ input priorities 108 that are controlled via an age parameter and a brink parameter. The node (tile) may be a device, such as a memory device for non-limiting example, as disclosed in FIG. 2B, below.

Figure 2B:
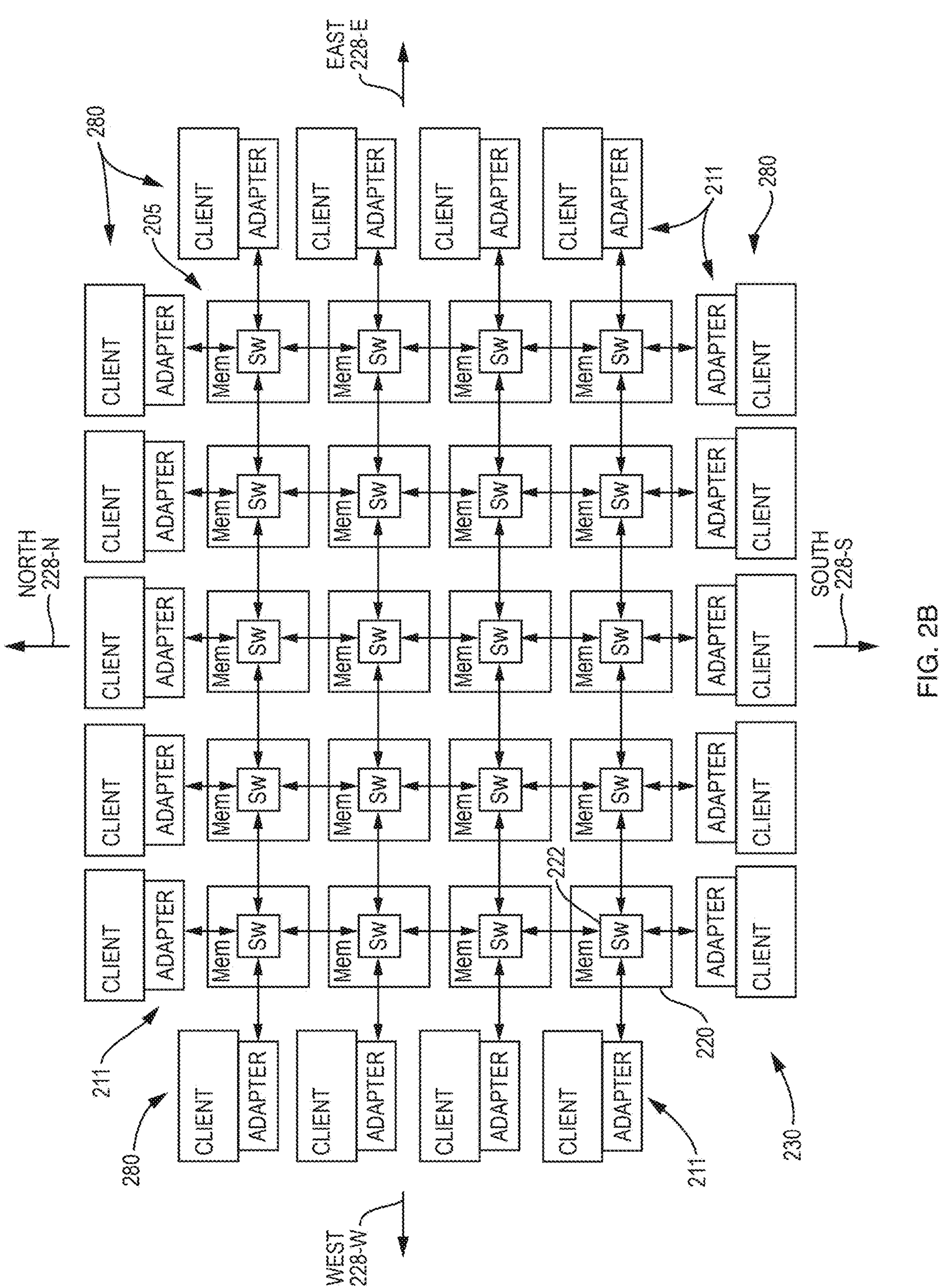
FIG. 2B is a block diagram of an example embodiment of a shared memory subsystem that may an example embodiment of a circuit disclosed herein.

FIG. 2B is a block diagram of an example embodiment of a shared memory subsystem that may employ an example embodiment of the circuit 100 of FIG. 1, disclosed above. With reference FIG. 2A and FIG. 2B, the network topology 213 may represent a shared memory subsystem 230, which may be implemented in a variety of networking and other computing applications. In such a configuration, several clients 280, such as processors, digital signal processors (DSPs), hardware accelerators or a combination thereof for non-limiting examples, may have access to a common, shared memory array 205 via respective memory interfaces or adapters 211.

As shown, the memory array 205 exhibits a "mesh" structure, which includes several memory devices (e.g., memory device 220) arranged in a grid pattern and coupled to neighboring memory devices. A "mesh" may be understood as a structure that divides a space into a matrix of nodes, and the interconnects between the nodes move data from one node to another based on a routing method as is known in the art. Thus, a client 280 may access, store, and retrieve data at any one of the devices of the array 205, and each of the devices may route the data along a path through the array 205 between the client 280 and a target device.

A transfer of data between two adjacent devices of the array 205 may be referred to as a "hop," and each hop may involve the transfer of data of any size between the devices. For example, a data transfer may be a parallel transmission of several bytes (e.g., 16, 32, or 64 bytes for non-limiting examples) of data between the devices. Such transfers occur both for requests from a client 280 and for a response from a target device, and each access operation can involve several such transfers between adjacent devices. As represented by the arrows within the array 205, each device, such as the device 220, may include several channels for such transfers, including channels for 2-way communications with each adjacent device. A bandwidth of the array 205 for such transfers, therefore, is a function of the bandwidth of these inter-device channels. Further, the latency of a transfer operation is defined by two variables: 1) the number of "hops" (devices traversed) for the data to reach its target (e.g., device 220 or client 280), and 2) the time taken by each device in the path of the transfer operation to forward the data to a next device of its routing path.

To facilitate traffic flow through the array 205, a memory device of the array 205, such as the memory device 220, may perform arbitration among multiple receive ports of a switch 222, referred to interchangeably herein as requesters, that have data for sending to a same output port (transmit port) of the switch 222 at the same time. Such an output port may be located in a cardinal direction, such as the north 228-N, south 228-N, east 228-E, and west 228-W directions for non-limiting example and may be referred to as an output port (transmit port) of the memory device 220, that may be referred to interchangeably herein as a node or tile. An example embodiment of the memory device 220 is disclosed below with regard to FIG. 2C.

Figure 2C:
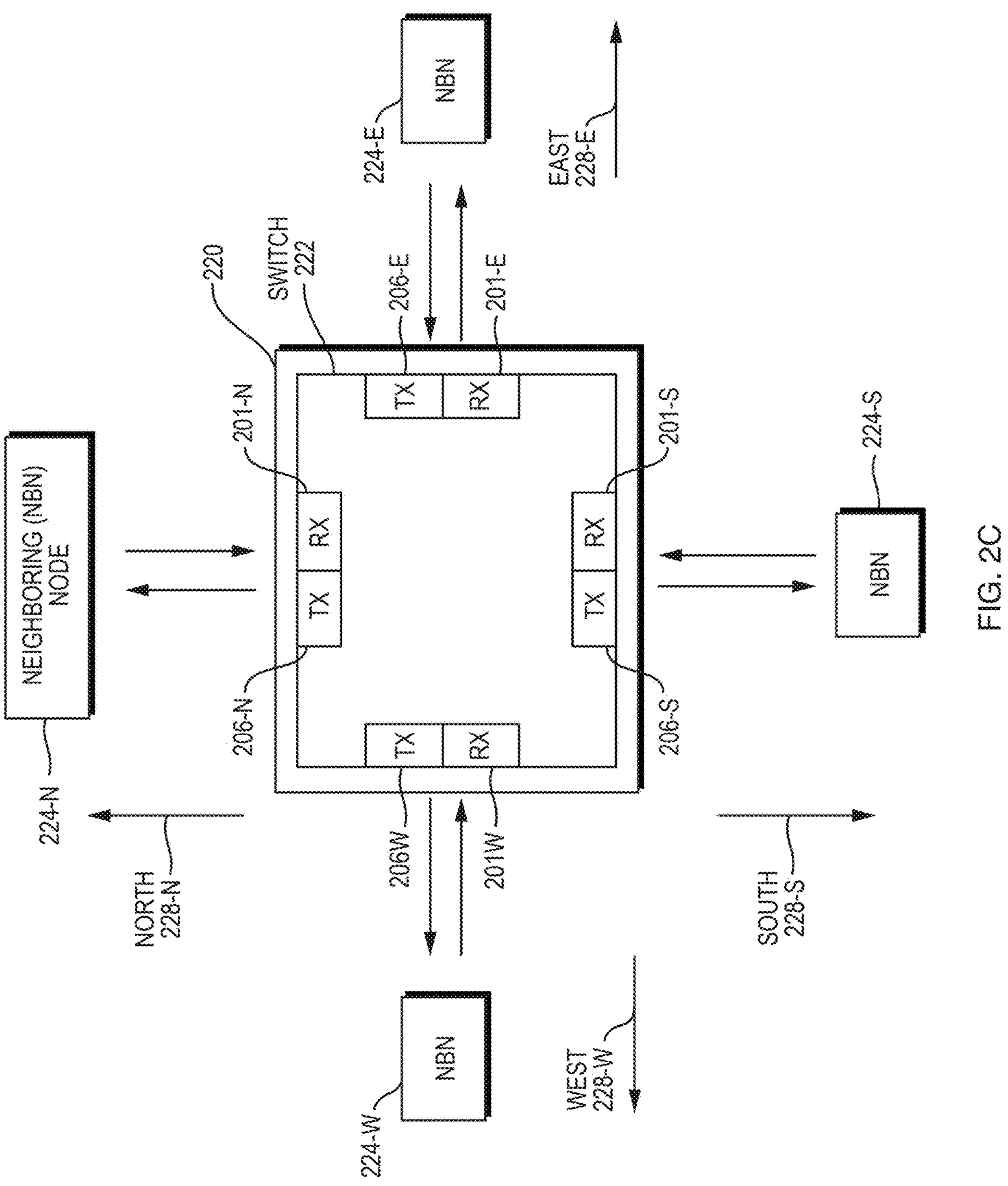
FIG. 2C is a block diagram of an example embodiment of a node.

FIG. 2C is a block diagram of an example embodiment of the memory device 220 (node, tile) of FIG. 2B. With reference to FIG. 2B and FIG. 2C, the memory device 220 may include a switch 222. The switch 222 may include a plurality of switch TX ports, namely the switch TX port 206-N, switch TX port 206-S, switch TX port 206-E, and switch TX port 206-W for non-limiting example, that may be configured to transmit to respective neighboring nodes (NBNs), such as the NBN 224-N, NBN 224-S, NBN 224-E, and NBN 224-W, respectively. It should be understood that the memory device 220 is not limited to four of such switch TX ports, that each of such switch TX ports need not be coupled to a respective NBN, and that such switch TX ports need not be arranged in the manner as shown in FIG. 2C. With regard to FIG. 1 and FIG. 2C, each of such TX ports may include a respective instance of the circuit 100, disclosed above.

Continuing with reference to FIG. 2C, the switch 222 further includes a plurality of switch RX ports, namely the switch RX port 201-N, switch RX port 201-S, switch RX port 201-E, and switch RX port 201-W, that may be configured to receive from respective NBNs, such as the NBN 224-N, NBN 224-S, NBN 224-E, and NBN 224-W, respectively. It should be understood that the node 220 is not limited to four of such switch RX ports, that each of such switch RX ports need not be coupled to a respective NBN, and that such switch RX ports need not be arranged in the manner as shown in FIG. 2C. With reference to FIG. 1 and FIG. 2C, such RX ports may serve as requesters of the circuit 100, wherein the circuit 100 may be employed by a TX port of the switch 222. It should be understood that an RX port of an RX/TX port pairing of the switch 222 does not serve as a requester (source) for the TX port of that particular pairing. As such, loopback of a packet received at an RX port is prevented.

Figure 2D:
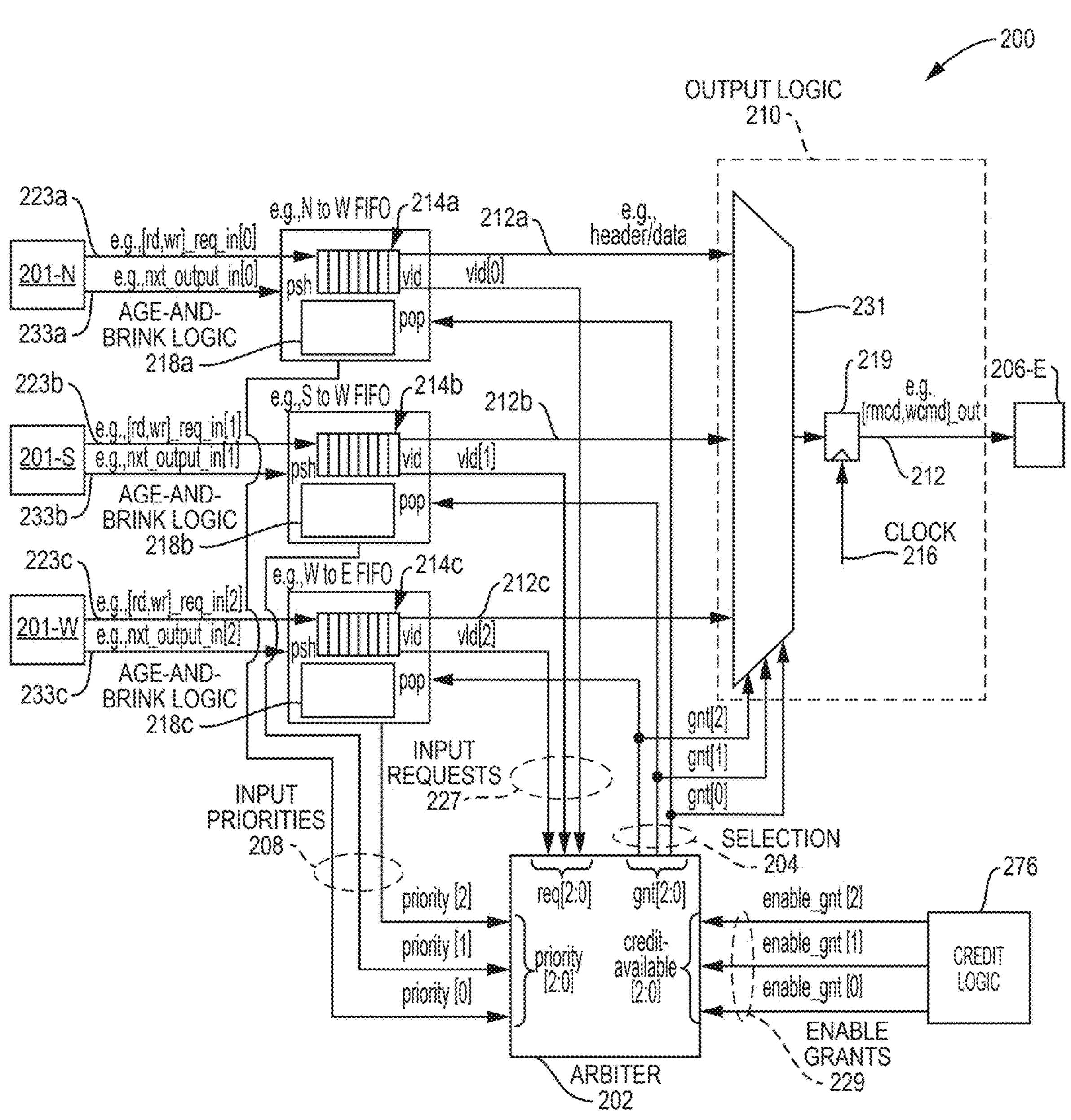
FIG. 2D is a schematic diagram of an example embodiment of a circuit that may be employed as the circuit of FIG. 1.

FIG. 2D is a schematic diagram of an example embodiment of a circuit 200 that may be employed as the circuit 100 of FIG. 1, disclosed above. With reference to FIG. 2C and FIG. 2D, the circuit 200 may perform arbitration for the switch 222 at the switch TX port 206-E for non-limiting example. It should be understood that the circuit 200 may be implemented similarly at the switch TX port 206-N, switch TX port 206-S, switch TX port 206-W.

The circuit 200 comprises an arbiter 202 configured to output a selection 204 for accessing a shared resource, namely the switch TX port 206-E in the example embodiment. The selection 204 may be based on input priorities 208 for multiple requesters, namely the switch RX ports 201-N, 201-S, and 201-W configured to share the shared resource, namely the switch TX port 206-E. The input priorities 208 may be controlled via an age parameter (not shown) and a brink parameter (not shown).

The age and brink parameters may be associated with buffers (214*a*, 214*b*, 214*c*) of the multiple requesters (201-N, 201-S, and 201-W). The circuit 200 further comprises output logic 210 coupled to the arbiter 202. The output logic 210 may be configured to select a requester (e.g., 201-N, 201-S, 201-W) of the multiple requesters (201-N, 201-S, and 201-W) based on the selection 204 output, and may transfer a stored data element 212 from a buffer (214*a*, 214*b*, or 214*c*) of the requester selected (e.g., 201-N, 201-S, 201-W) to the shared resource, namely the switch TX port 206-E in the example embodiment. For non-limiting example, the output logic 210 may include a multiplexer 231 configured to select an output data element (212*a*, 212*b*, 212*c*) output by a corresponding buffer (214*a*, 214*b*, 214*c*) of the requester selected based on the selection 204. The output data element (214*a*, 214*b*, 214*c*) selected may be buffered via a flop 219 for non-limiting example and output to the shared resource, such as the switch TX port 206-E in the non-limiting example.

The arbiter 200 may be further configured to cause the stored data element 212 to be output from the buffer (214*a*, 214*b*, or 214*c*) to the output logic 210 via the selection 204 output. For example, the buffer may be a FIFO queue for non-limiting example. The selection 204 output may be configured to cause the stored data element 212 to be popped from the FIFO queue to the output logic 210.

The age parameter may represent a threshold number of clock cycles for storing a data element in a respective buffer of a requester of the multiple requesters (201-N, 201-S, 201-W). The clock cycles may be associated with a clock 216 of the circuit 200. The clock 216 may be a system clock for non-limiting example. The brink parameter may represent a threshold number of buffer entries available in the respective buffer prior to overflow of the respective buffer.

The circuit 200 may further comprise age-and-brink logic (218*a*, 218*b*, 218*c*) corresponding to a requester of the multiple requesters (201-N, 201-S, 201-W). The age-and-brink logic (218*a*, 218*b*, 218*c*) may be configured to generate a source priority indicator, a brink-threshold-reached indicator, and an age-threshold-reached indicator, such as disclosed below with regard to FIG. 3.

Figure 3:
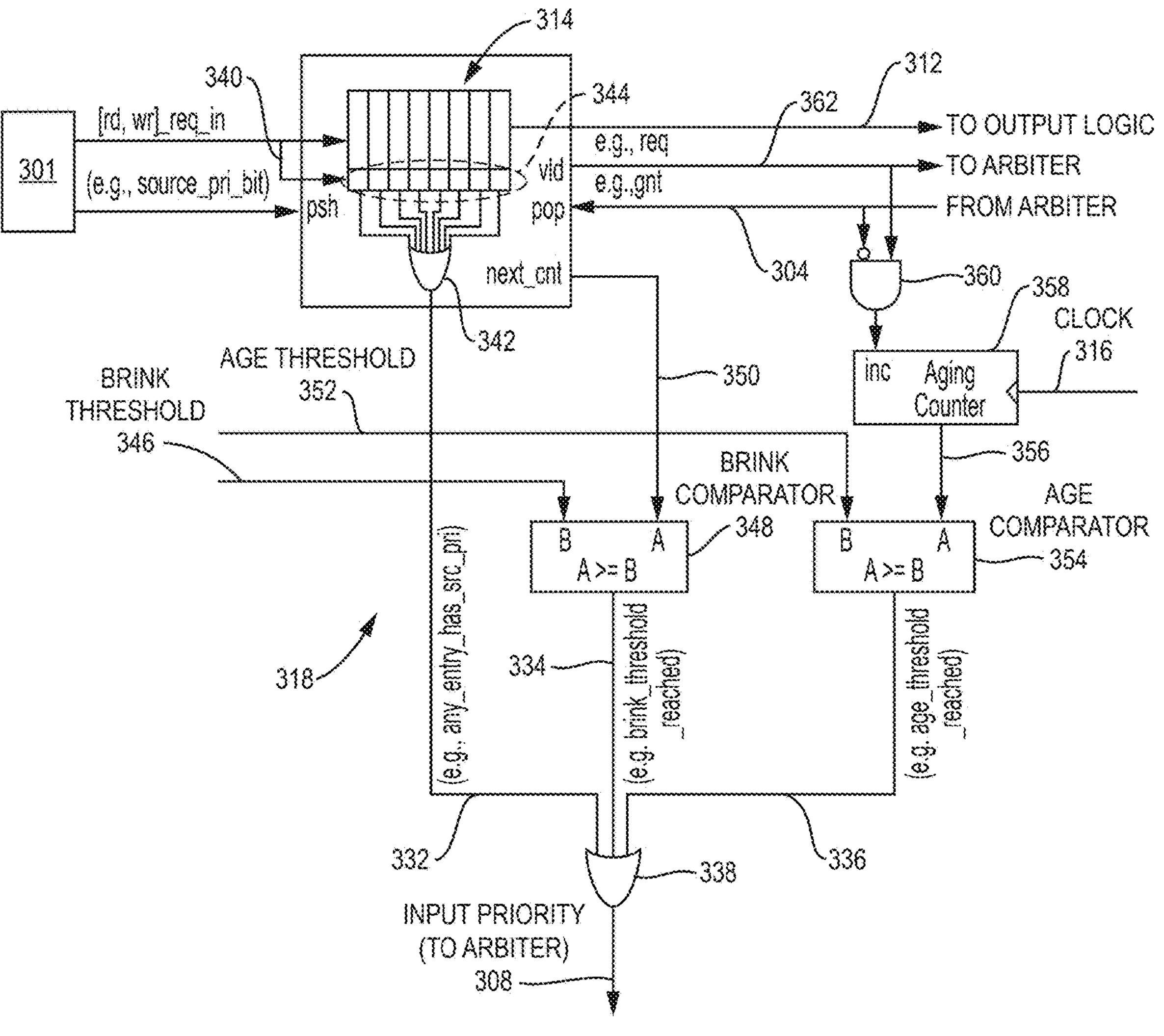
FIG. 3 is a schematic diagram of an example embodiment of age-and-brink logic.

FIG. 3 is a schematic diagram of an example embodiment of age-and-brink logic 318. With reference to FIG. 2D and FIG. 3, the age-and-brink-logic 318 may be employed as the age-and-brink logic 218*a*, 218*b*, or 218*c*. The selection 204 output may be configured to cause the stored data element 312 to be output from the buffer 314 to the output logic 210. The age-and-brink logic 318 may be configured to generate a source priority indicator 332, a brink-threshold-reached indicator 334, and an age-threshold-reached indicator 336. The age-and-brink logic 318 may be configured to control an input priority 308 of the input priorities 208 (e.g., priority [2:0]) based on the source priority indicator 332 generated, the brink-threshold-reached indicator 334 generated, and the age-threshold-reached indicator 336 generated. The input priority 308 may correspond to a requester 301 of the multiple requesters (201-N, 201-S, 201-W) and may represent a prioritized status or a non-prioritized status for non-limiting example. The prioritized status may be considered a high priority status whereas the non-prioritized status may be considered a low priority status that is lower relative to the high priority status.

The age-and-brink logic 318 may be further configured to cause the input priority 308 to represent the prioritized status in an event the source priority indicator 332 generated, brink-threshold-reached indicator 334 generated, age-threshold-reached indicator 336 generated, or a combination thereof are asserted, and to represent the non-prioritized status otherwise. In the example embodiment of FIG. 3, an input priority OR gate 338 may be employed to determine the input priority 308 by performing a logical OR of the source priority indicator 332 generated, brink-threshold-reached indicator 334 generated, age-threshold-reached indicator 336 generated. It should be understood, however, that use of the OR gate 338 is for non-limiting example.

The age-and-brink logic 318 may be further configured to assert the source priority indicator 332 generated in an event at least one data element stored in a respective buffer 314 of the requester 301 is associated with an asserted source priority identifier, that is, a source priority identifier 340 that is in an asserted state, and to de-assert the source priority indicator 332 generated in an event there is no data element stored in the respective buffer that is associated with the asserted source priority identifier 340. The source priority identifier may be configured in a packet by a source (originator) of the packet.

For example, with reference to FIG. 2B and FIG. 3, the source, such as a client 280 may assert the source priority identifier 340 in a packet header of the packet which may be a memory read or write command considered to be a high priority transaction. Alternatively, a particular source may always have priority and, thus, packets from such a source, such as a DSP processor for non-limiting example, may always have the source identifier asserted in a packet header of a packet sourced by such a source. Continuing with reference to FIG. 3, according to an example embodiment, the age-and-brink logic 318 may include a source priority OR gate 342 configured to perform a logical OR of the source priority identifiers 344 of stored data elements in the buffer 314 for non-limiting example.

The age-and-brink logic 318 may be further configured to assert the brink-threshold-reached indicator 334 generated in an event a total number 350 of data elements stored in the buffer 301 is at or above a brink threshold 346 and de-assert the brink-threshold-reached indicator 334 in an event the total number of data elements stored is below the brink threshold 346. The brink threshold 346 may be output from a control/status register (CSR) for non-limiting example. The brink threshold 346 may be a difference between a total number of entries of the buffer 301 and the brink parameter. The age-and-brink logic 318 may include a brink comparator 348 configured to compare the total number 350 of data elements stored in the buffer 301 to the brink threshold 346 and output the brink-threshold-reached indicator 334 based on a comparison thereof.

The age-and-brink logic 318 may be further configured to assert the age-threshold-reached indicator 336 generated in an event a data element stored at a head of the buffer 301 is associated with an age that is at or above an age threshold 352 and de-assert the age-threshold-reached indicator 336 otherwise. The age parameter may represent the age threshold 352. The age-and-brink logic 318 may include an age comparator 354 configured to compare an age 356 of the data element stored at a head of the buffer 301 to the age threshold 352 and output the age-threshold-reached indicator 336 based on a comparison thereof.

The buffer 301 may be a FIFO queue for non-limiting example. As such, the age-and-brink logic 318 may be configured to control the input priority 308 for the requester 301 based on a comparison of the brink threshold 346 with a total number of data elements 350 stored in the FIFO queue of the requester 301. The brink threshold 346 may be a difference between a total number of entries of the FIFO queue and the brink parameter. Further, the age-and-brink logic 318 may be configured to control the input priority 308 for the requester 301 based on a comparison of the age parameter, that is, the age threshold 352, with an age 356 of an oldest, topmost data element of a FIFO queue of the requester 301. The age parameter may represent a threshold number of clock cycles of a clock of the clock 316. The age 356 may be a total count of clock cycles of the clock 316 for which the oldest, topmost data element has been queued in the FIFO queue, that is, the buffer 314.

The age 356 may be determined via a single aging counter 358. Alternatively, a plurality of per-entry aging counters may be employed to maintain respective ages of stored entries. The aging counter 358 may be configured to be reset one either the selection 304 being asserted to represent a granted request or if the pending request 362 is de-asserted. The aging counter 358 may, together with the aging logic 360, be configured to track a total number of consecutive clock cycles of a clock 316 for which the buffer 314 has a pending request 362 asserted that is not granted, as determined via the selection 304 output by the arbiter, such as the arbiter 202 of FIG. 2D.

With reference back to FIG. 2D, the arbiter 202 may be further configured to select a requester of the multiple requesters (201-N, 201-S, 201-W) to participate in a high priority arbitration cycle in an event a respective input priority (priority [0], priority [1], or priority [2]) of the requester represents a prioritized status and to exclude the requester from the high priority arbitration cycle in an event the respective input priority of the requester represents the non-prioritized status.

The age-and-brink logic (218*a*, 218*b*, 218*c*) may be configured to control an input priority (priority [0], priority [1], or priority [2]) for a respective requester by configuring the input priority to represent a prioritized status or a non-prioritized status. The arbiter 202 may be further configured to select a requester of the multiple requesters (201-N, 201-S, 201-W) to participate in a high priority arbitration cycle in an event a respective input priority of the requester represents the prioritized status. The arbiter 202 may be further configured to exclude the requester from the high priority arbitration cycle in an event the respective input priority of the requester represents the non-prioritized status. The arbiter 202 may be a round-robin arbiter as disclosed below with regard to FIG. 4.

Figure 4:
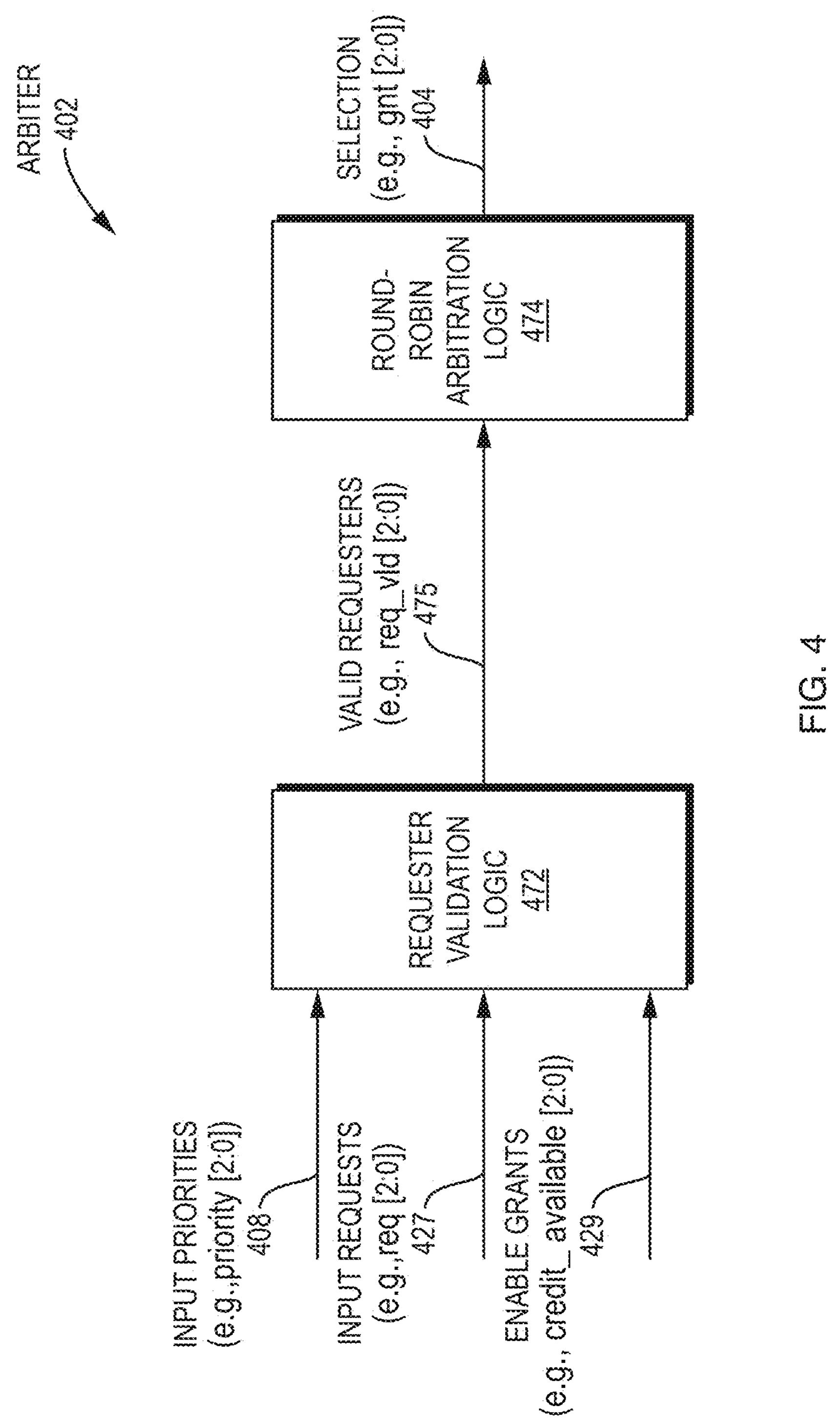
FIG. 4 is a block diagram of an example embodiment of an arbiter.

FIG. 4 is block diagram of an example embodiment of an arbiter 402 that may be employed as the arbiter 102 of FIG. 1 or the arbiter 202 of FIG. 2D, disclosed above. With reference to FIG. 4, the arbiter 402 may be a round-robin arbiter that includes requester validation logic 472 and round-robin arbitration logic 474. The arbiter 402 may be configured to output a selection 404 for accessing a shared resource, such as the switch transmit port 206-E of FIG. 2D.

With reference to FIG. 2D and FIG. 4, the requester validation logic 472 may be configured to select requesters with valid requests and output valid requesters 475. According to a non-limiting example embodiment, the valid requesters 475 may be output as a bitvector (req_vld[2:0]) that indicates whether each of the multiple requesters (201-N, 201-S, 201-W) has a valid request. The requester validation logic 472 may, for non-limiting example, receive bitvectors corresponding to input requests (req[3:0]) (227, 427), input priorities (priority [3:0]) (208, 408), and enable grants (229, 429). The enable grants (229, 429) may also be referred to as credits available (credit_available[3:0]).

According to an example embodiment, if the requester validation logic 472 detects an asserted input priority of the input priorities (208, 408) for a requester that has its corresponding enable grant of the enable grants (229, 429) asserted, and its corresponding input request of the input requests (227, 427) asserted, then it may select such requester for arbitration by indicating that such requester is valid for arbitration via the valid requesters 475 input to the round-robin arbitration logic 474. The input requests (227, 427) represent whether a corresponding buffer has at least one stored element. The requester validation logic 472 may output the valid requesters 475 indicating only those requesters with priority requests, preserving the non-priority requests for a subsequent round-robin arbitration.

As such, with reference to FIG. 2D and FIG. 4, the selection 404 may be based on input priorities (208, 408) for the multiple requesters (201-N, 201-S, 201-W) configured to share the shared resource 206-E. The multiple requesters (201-N, 201-S, 201-W) may be coupled to an adjacent node (tile) that drives the respective data input (223*a*, 223*b*, 223*c*) to a corresponding buffer (214*a*, 214*b*, 214*c*) via a respective write (push) signal (233*a*, 233*b*, 233*c*). The respective write (push) signal (233*a*, 233*b*, 233*c*) may be driven based on packet header and routing logic (not shown) performed by the adjacent node (tile). The selection (204, 404) output may be further based on round-robin priorities (not shown) of the multiple requesters (201-N, 201-S, 201-W) and such round-robin priorities may be determined by the round-robin arbitration logic 474 of the arbiter 402.

The requester validation logic 472, in combination with the round-robin arbitration logic 474, enable the arbiter 402 to be configured to output the selection 404 based on round-robin arbitration performed by the round-robin arbitration logic 474, and to exclude a requester of the multiple requesters (201-N, 201-S, 201-W) from the round-robin arbitration: a) in an event the requester has no pending request for the shared resource 206-E, b) in an event the requester does not have at least one credit for a pending request as determined via credit logic 276, and c) in an event an input priority of the input priorities indicates a non-prioritized request. Thus, the arbiter (202, 402) may be configured to uphold packet priority, for example by cycling through pending priority packets (e.g., via a round-robin selection process) followed by a subsequent cycling through non-priority packets. The pending request may be for transmission of a packet via the shared resource 206-E for non-limiting example.

Figure 5:
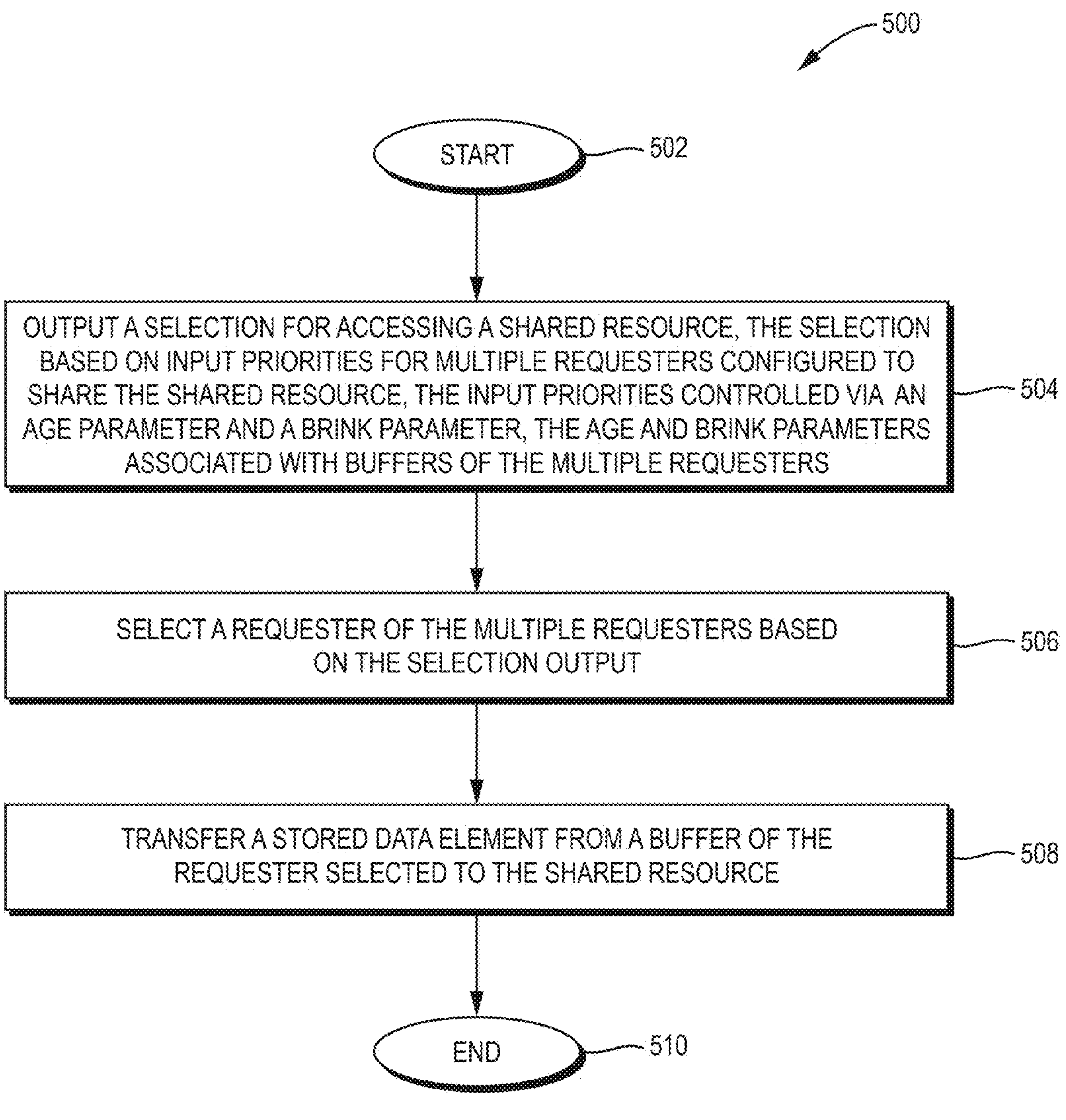
FIG. 5 is a flow diagram of an example embodiment of a method.

FIG. 5 is a flow diagram 500 of an example embodiment of a method. The method begins (502) and comprises outputting a selection for accessing a shared resource (504). The selection may be based on input priorities for multiple requesters configured to share the shared resource. The input priorities may be controlled via an age parameter and a brink parameter. The age and brink parameters may be associated with buffers of the multiple requesters. The method may further comprise selecting a requester of the multiple requesters based on the selection output (506) and transferring a stored data element from a buffer of the requester selected to the shared resource (508). The method thereafter ends (510) in the example embodiment.

Using arbitration based on both age and brink parameters, a C++ performance model showed the following improvements for non-limiting example: stalls per cycle per tile from 0.08 to 0.01 (8× reduction), bandwidth increased from 898.9 to 905.4 MB/s (0.7% improvement), and most notably, max worst case end-to-end latency improved from 186 to 127 (~30% reduction). This is a significant improvement in network efficiency (max latency and to a lesser extent stalls & bandwidth) for a small cost. An example embodiment may employ a brink parameter of 1 or 2 and an age parameter of 12-16 cycles for non-limiting examples as optimum values for such parameters may vary based on topology.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A circuit comprising:

an arbiter configured to output a selection for accessing a shared resource, the selection based on input priorities for multiple requesters configured to share the shared resource, the input priorities controlled via an age parameter and a brink parameter, the age and brink parameters associated with buffers of the multiple requesters; and output logic coupled to the arbiter, the output logic configured to select a requester of the multiple requesters based on the selection output and transfer a stored data element from a buffer of the requester selected to the shared resource, wherein the age parameter represents a threshold number of clock cycles for storing a data element in a respective buffer of a requester of the multiple requesters and wherein the brink parameter represents a threshold number of buffer entries available in the respective buffer prior to overflow of the respective buffer.

2. The circuit of claim 1, wherein the arbiter is further configured to cause the stored data element to be output from the buffer to the output logic via the selection output.

3. The circuit of claim 1, wherein the clock cycles are associated with a clock of the circuit.

4. The circuit of claim 1, wherein the circuit further comprises age-and-brink logic corresponding to a requester of the multiple requesters, the age-and-brink logic configured to:

generate a source priority indicator, a brink-threshold-reached indicator, and an age-threshold-reached indicator; and control an input priority of the input priorities based on the source priority indicator generated, the brink-threshold-reached indicator generated, and the age-threshold-reached indicator generated, the input priority corresponding to the requester and representing a prioritized status or a non-prioritized status, the age-and-brink logic further configured to cause the input priority to represent the prioritized status in an event the source priority indicator generated, brink-threshold-reached indicator generated, age-threshold-reached indicator generated, or a combination thereof are asserted, and to represent the non-prioritized status otherwise.

5. The circuit of claim 4, wherein the age-and-brink logic is further configured to:

assert the source priority indicator generated in an event at least one data element stored in a respective buffer of the requester is associated with an asserted source priority identifier and to de-assert the source priority indicator generated in an event there is no data element stored in the respective buffer that is associated with the asserted source priority identifier;

assert the brink-threshold-reached indicator generated in an event a total number of data elements stored in the respective buffer is at or above a brink threshold and de-assert the brink-threshold-reached indicator in an event the total number of data elements stored is below the brink threshold, wherein the brink threshold is a difference between a total number of entries of the respective buffer and the brink parameter; and assert the age-threshold-reached indicator generated in an event a data element stored at a head of the respective buffer is associated with an age that is at or above an age threshold and de-assert the age-threshold-reached indicator otherwise, wherein the age parameter represents the age threshold.

6. The circuit of claim 1, wherein the arbiter is further configured to select a requester of the multiple requesters to participate in a high priority arbitration cycle in an event a respective input priority of the requester represents a prioritized status and to exclude the requester from the high priority arbitration cycle in an event the respective input priority of the requester represents the non-prioritized status.

7. The circuit of claim 1, wherein the circuit further comprises age-and-brink logic configured to control an input priority for a respective requester based on a comparison of a brink threshold with a total number of data elements stored in a first-in first-out (FIFO) queue of the respective requester and wherein the brink threshold is a difference between a total number of entries of the FIFO queue and the brink parameter.

8. The circuit of claim 1, wherein the circuit further comprises age-and-brink logic configured to control an input priority for a respective requester based on a comparison of the age parameter with an age of an oldest, topmost data element of a FIFO queue of the respective requester, and wherein the age is a total count of clock cycles of the clock for which the oldest, topmost data element has been queued in the FIFO queue.

9. The circuit of claim 1, wherein the circuit further comprises age-and-brink logic configured to control an input priority for a respective requester by configuring the input priority to represent a prioritized status or a non-prioritized status and wherein the arbiter is further configured to select a requester of the multiple requesters to participate in a high priority arbitration cycle in an event a respective input priority of the requester represents the prioritized status and to exclude the requester from the high priority arbitration cycle in an event the respective input priority of the requester represents the non-prioritized status.

10. The circuit of claim 1, wherein the buffer is a FIFO queue, wherein the selection output is configured to cause the stored data element to be popped from the FIFO queue to the output logic, and wherein the shared resource is a transmit (TX) port.

11. The circuit of claim 1, wherein the arbiter is a round-robin arbiter and wherein the selection output is further based on round-robin priorities of the multiple requesters.

12. The circuit of claim 1, wherein the circuit is located on a chip, wherein the circuit is coupled to an interconnect of the chip, wherein the multiple requesters are receive (RX) ports of the circuit, and wherein the shared resource is a TX port of the circuit.

13. The circuit of claim 1, wherein the arbiter is further configured to output the selection based on round-robin arbitration and to exclude a requester of the multiple requesters from the round-robin arbitration in an event the requester has no pending request for the shared resource or in an event the requester does not have at least one credit for a pending request, and wherein the pending request is for transmission of a packet via the shared resource.

14. The circuit of claim 1, wherein the arbiter is further configured to output the selection on a cycle-by-cycle basis.

15. A method comprising:

outputting a selection for accessing a shared resource, the selection based on input priorities for multiple requesters configured to share the shared resource, the input priorities controlled via an age parameter and a brink parameter, the age and brink parameters associated with buffers of the multiple requesters;

selecting a requester of the multiple requesters based on the selection output; and transferring a stored data element from a buffer of the requester selected to the shared resource, wherein the age parameter represents a threshold number of clock cycles for storing a data element in a respective buffer of a requester of the multiple requesters and wherein the brink parameter represents a threshold number of buffer entries available in the respective buffer prior to overflow of the respective buffer.

16. The method of claim 15, further comprising causing the stored data element to be output from the buffer to the output logic via the selection output.

17. The method of claim 15, wherein the clock cycles are associated with a clock of the circuit.

18. The method of claim 15, further comprising:

generating a source priority indicator, a brink-threshold-reached indicator, and an age-threshold-reached indicator for a requester of the multiple requesters; and controlling an input priority of the input priorities based on the source priority indicator generated, the brink-threshold-reached indicator generated, and the age-threshold-reached indicator generated, the input priority corresponding to the requester and representing a prioritized status or a non-prioritized status, wherein the controlling includes causing the input priority to represent the prioritized status in an event the source priority indicator generated, brink-threshold-reached indicator generated, age-threshold-reached indicator generated, or a combination thereof are asserted, and to represent the non-prioritized status otherwise.

19. The method of claim 18, wherein the generating includes:

asserting the source priority indicator generated in an event at least one data element stored in a respective buffer of the requester is associated with an asserted source priority identifier and de-asserting the source priority indicator generated in an event there is no data element stored in the respective buffer that is associated with the asserted source priority identifier;

asserting the brink-threshold-reached indicator generated in an event a total number of data elements stored in the respective buffer is at or above a brink threshold and de-asserting the brink-threshold-reached indicator in an event the total number of data elements stored is below the brink threshold, wherein the brink threshold is a difference between a total number of entries of the respective buffer and the brink parameter; and asserting the age-threshold-reached indicator generated in an event a data element stored at a head of the respective buffer is associated with an age that is at or above an age threshold and de-asserting the age-threshold-reached indicator otherwise, wherein the age parameter represents the age threshold.

20. The method of claim 15, further comprising:

selecting a requester of the multiple requesters to participate in a high priority arbitration cycle in an event a respective input priority of the requester represents a prioritized status; and excluding the requester from the high priority arbitration cycle in an event the respective input priority of the requester represents the non-prioritized status.

21. The method of claim 15, further comprising:

controlling an input priority for a respective requester based on a comparison of a brink threshold with a total number of data elements stored in a first-in first-out (FIFO) queue of the respective requester and wherein the brink threshold is a difference between a total number of entries of the FIFO queue and the brink parameter.

22. The method of claim 15, further comprising:

controlling an input priority for a respective requester based on a comparison of the age parameter with an age of an oldest, topmost data element of a FIFO queue of the respective requester, and wherein the age is a total count of clock cycles of the clock for which the oldest, topmost data element has been queued in the FIFO queue.

23. The method of claim 15, further comprising:

controlling an input priority for a respective requester by configuring the input priority to represent a prioritized status or a non-prioritized status;

selecting a requester of the multiple requesters to participate in a high priority arbitration cycle in an event a respective input priority of the requester represents the prioritized status; and excluding the requester from the high priority arbitration cycle in an event the respective input priority of the requester represents the non-prioritized status.

24. The method of claim 15, wherein the buffer is a FIFO queue, wherein the method further comprises causing the stored data element to be popped from the FIFO queue to the output logic based on the selection output, and wherein the shared resource is a transmit (TX) port.

25. The method of claim 15, wherein the selection output is further based on round-robin priorities of the multiple requesters.

26. The method of claim 15, wherein the selection output is based on round-robin arbitration and wherein the method further comprises excluding a requester of the multiple requesters from the round-robin arbitration in an event the requester has no pending request for the shared resource or in an event the requester does not have at least one credit for a pending request, wherein the pending request is for transmission of a packet via the shared resource.

27. The method of claim 15, further comprising outputting the selection on a cycle-by-cycle basis.

28. An apparatus comprising:

means for outputting a selection for accessing a shared resource, the selection based on input priorities for multiple requesters configured to share the shared resource, the input priorities controlled via an age parameter and a brink parameter, the age and brink parameters associated with buffers of the multiple requesters;

means for selecting a requester of the multiple requesters based on the selection output; and means for transferring a stored data element from a buffer of the requester selected to the shared resource, wherein the age parameter represents a threshold number of clock cycles for storing a data element in a respective buffer of a requester of the multiple requesters and wherein the brink parameter represents a threshold number of buffer entries available in the respective buffer prior to overflow of the respective buffer.

* * * * *